United States Patent
Jiang et al.

(10) Patent No.: US 9,856,127 B2
(45) Date of Patent: Jan. 2, 2018

(54) WATER SUPPLY APPARATUS

(71) Applicants: FOSHAN MIDEA CHUNGHO WATER PURIFICATION EQUIPMENT CO., LTD., Foshan (CN); MIDEA GROUP CO., LTD., Foshan (CN)

(72) Inventors: Chengfeng Jiang, Foshan (CN); Yong Gao, Foshan (CN); Xingfan Li, Foshan (CN); Jianzhou Xie, Foshan (CN)

(73) Assignees: FOSHAN MIDEA CHUNGHO WATER PURIFACTION EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 14/771,543

(22) PCT Filed: Apr. 30, 2015

(86) PCT No.: PCT/CN2015/078059
§ 371 (c)(1),
(2) Date: Jul. 8, 2016

(87) PCT Pub. No.: WO2016/161681
PCT Pub. Date: Oct. 13, 2016

(65) Prior Publication Data
US 2017/0008749 A1 Jan. 12, 2017

(30) Foreign Application Priority Data

Apr. 10, 2015 (CN) .......................... 2015 1 0170385
Apr. 10, 2015 (CN) ...................... 2015 2 0217251 U

(51) Int. Cl.
B67D 1/08 (2006.01)
F25D 11/00 (2006.01)
(Continued)

(52) U.S. Cl.
CPC ............ *B67D 1/0861* (2013.01); *A47J 31/44* (2013.01); *F25D 11/00* (2013.01); *F25D 29/00* (2013.01); *F25D 31/002* (2013.01)

(58) Field of Classification Search
CPC ........ A47J 31/44; F25D 31/002; F25D 29/00; F25D 11/00; F25D 31/00; B67D 1/0861; B67D 1/08
(Continued)

(56) References Cited

U.S. PATENT DOCUMENTS 1,972,079 A * 9/1934 Erbach .................. F25D 31/002
62/220
3,333,438 A * 8/1967 Benua .................. B67D 1/0009
222/146.1
(Continued)

FOREIGN PATENT DOCUMENTS

CN 2579302 Y 10/2003
CN 201164376 Y 12/2008
(Continued)

*Primary Examiner* — Mohammad M Ali
(74) *Attorney, Agent, or Firm* — Hodgson Russ LLP

(57) ABSTRACT

Provided is a water supply apparatus (100) including: a cooling tank (1), a refrigerating systems and a heat exchange device (4). The cooling tank is provided with a cold water outlet (11) and suitable to connected to water source; the refrigeration system comprises a compressor (31), a condenser (32), a throttling device (33) and the evaporator (34). The heat exchange device (4) is arranged outside the cooling tank (1) and provided with a water inlet (41) and a water outlet (42) communicating with the inside of the cooling tank (1), wherein the heat exchange device (4) is constructed such that water in the cooling tank (1) flows into the heat exchange device (4) from the water inlet (41) and performs a heat exchange with the evaporator (34), the water after the heat exchange flows out from the water outlet (42) and flows back to the cooling tank (1).

13 Claims, 2 Drawing Sheets

(51) Int. Cl.
*F25D 29/00* (2006.01)
*F25D 31/00* (2006.01)
*A47J 31/44* (2006.01)

(58) Field of Classification Search
USPC .................................................. 62/394, 399
See application file for complete search history.

(56) References Cited

U.S. PATENT DOCUMENTS

| | | | | |
|---|---|---|---|---|
| 3,367,133 | A * | 2/1968 | Dreis | B67D 3/0009 |
| | | | | 62/390 |
| 3,824,801 | A * | 7/1974 | Laudato, Jr. | F25D 31/002 |
| | | | | 62/201 |
| 4,462,220 | A * | 7/1984 | Iannelli | B67D 1/06 |
| | | | | 165/163 |
| 5,560,211 | A * | 10/1996 | Parker | B67D 1/0869 |
| | | | | 62/137 |
| 5,992,684 | A * | 11/1999 | Russell | B67D 1/006 |
| | | | | 222/1 |
| 2008/0011660 | A1 * | 1/2008 | Walton | B67D 3/0032 |
| | | | | 210/209 |
| 2008/0264877 | A1 * | 10/2008 | Davis | B67D 3/0009 |
| | | | | 210/760 |

FOREIGN PATENT DOCUMENTS

| | | |
|---|---|---|
| CN | 201225793 Y | 4/2009 |
| CN | 204520338 U | 8/2015 |
| JP | H1026455 A | 1/1998 |

\* cited by examiner

WATER SUPPLY APPARATUS

CROSS-REFERENCE TO RELATED APPLICATION

This application is a National Stage application of International patent application PCT/CN2015/078059, filed Apr. 30, 2015, which claims the benefit of and priority to Chinese Application No. 201510170385.0 filed Apr. 10, 2015 and Chinese Application No. 201520217251.5 filed Apr. 10, 2015, the disclosures of which are incorporated herein by reference in their entirety.

FIELD

The present disclosure relates to a water supply apparatus manufacturing technology, and more particularly to a water supply apparatus.

BACKGROUND

In related technology, an evaporator of a purifying drinking water machine basically is arranged on inner or exospore of a cooling tank, thus cleaning the cooling tank is inconvenient. Besides, with regard to a detachable cooling tank, the evaporator is also arranged on periphery of a detachable cooling tank basically. In this way, cleaning the cooling tank has become convenient, but the refrigeration effect is not distinct.

SUMMARY

Embodiments of the present disclosure seek to solve at least one of the problems existing in the related art. For this reason, one purpose of the present disclosure is to provide a water supply apparatus and cleaning the cooling tank thereof is convenient.

The water supply apparatus according to embodiments of the present disclosure comprises:

a cooling tank with a cold water outlet, wherein the cooling tank is suitable for being connected with a water source and the water source is configured for supplying water to the cooling tank;

a refrigeration system comprising a compressor, a condenser, a throttling device and an evaporator sequentially connected head to tail; and a heat exchange device disposed outside the cooling tank and provided with a water inlet and a water outlet communicating with an inside of the cooling tank;

wherein the heat exchange device is configured such that water in the cooling tank flows into the heat exchange device from the water inlet and performs a heat exchange with the evaporator, the water after the heat exchange flows out from the water outlet and flows back to the cooling tank.

The water supply apparatus according to embodiments of the present disclosure, by disposing the heat exchange device outside the cooling tank, the water in the cooling tank performs a heat exchange with the evaporator, so that it is convenient to clean the cooling tank and the cooling effect of the water supply apparatus is excellent.

The heat exchange device according to an embodiment of the present disclosure comprises a body in which the water inlet and the water outlet are formed, wherein the evaporator is provided inside the body.

The heat exchange device according to an embodiment of the present disclosure comprises a heat exchange tube, the water inlet and the water outlet are formed at a first end and a second end of the heat exchange tube respectively, and the evaporator is provided outside the heat exchange tube.

According to an embodiment of the present disclosure, a water pump is provided between the cooling tank and the water inlet.

According to an embodiment of the present disclosure, a cold water switch is provided between the cold water outlet and the water pump.

According to an embodiment of the present disclosure, a refrigeration temperature controller is provided in the cooling tank.

According to an embodiment of the present disclosure, a water level control switch is provided in the cooling tank.

The water supply apparatus according to an embodiment of the present disclosure further comprises an exhausting device connected with the heat exchange device.

According to an embodiment of the present disclosure, the exhausting device is communicated to an inside of the cooling tank so as to exhaust the gas in the cooling tank.

According to an embodiment of the present disclosure, the cooling tank is an open cooling tank or a closed cooling tank.

According to an embodiment of the present disclosure, the throttling device is a capillary or an electronic expansion valve.

According to an embodiment of the present disclosure, the water supply apparatus is a water dispenser, a water purifier or a purifying drinking machine.

Additional aspects and advantages of embodiments of present disclosure will be given in part in the following descriptions, and become apparent in part from the following descriptions, or can be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which.

REFERENCE NUMERALS

Figure 1:
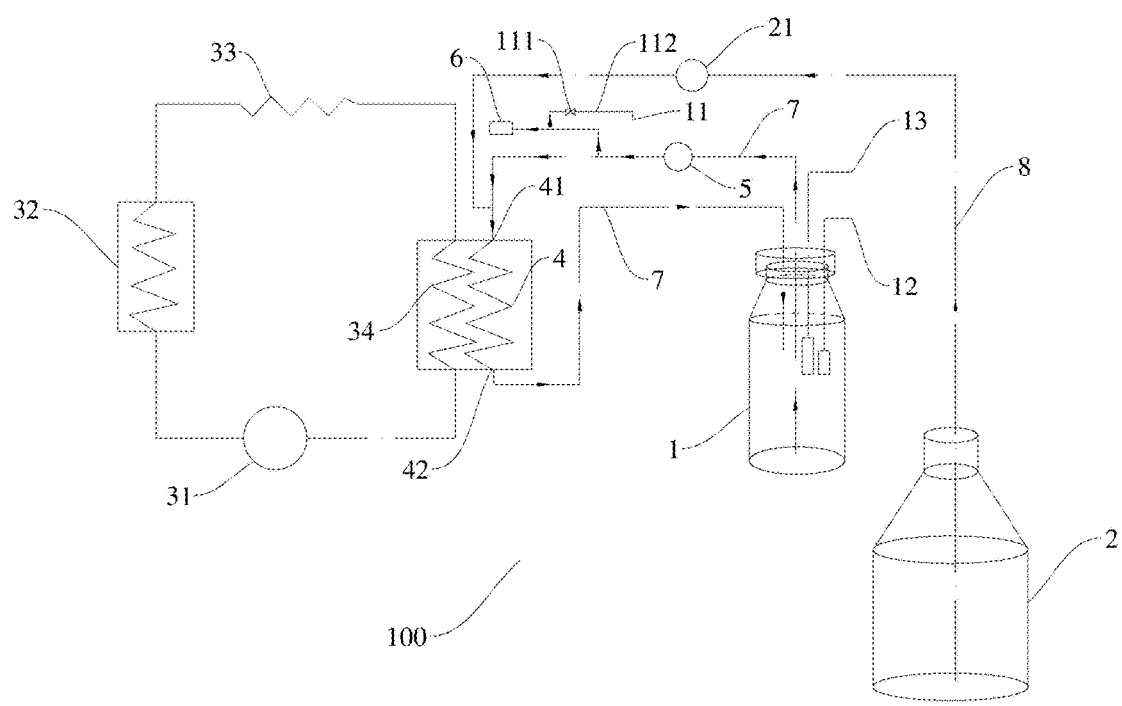
FIG. 1 is a schematic view of the water supply apparatus according to an embodiment of the present disclosure.

100: water supply apparatus;
1: cooling tank;
11: cold water outlet;
12: refrigeration temperature controller;
13: water level control switch;
111: cold water switch;
112: cold water pipe;
2: barreled water;
21: the first water pump;
31: compressor;
32: condenser;
33: throttling device;
34: evaporator;
4: heat exchange device;
41: water inlet;
42: water outlet;
5: water pump;
6: exhausting device;
7: connecting pipeline;
8: pipeline.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

In the description of the present disclosure, it is to be understood that the direction and the position relation indicated by terms like "center", "vertical", "horizontal", "length", "width"", "upper", "under", "before", "behind", "left", "right", "vertical", "horizontal", "top", "bottom", "inside", "external", "axial", "radial" and "circumferential", etc. is the direction and the position relation based on the showing of the figures, which are used to illustrate the present disclosure and simplify the description, but shall not be construed to may explicitly or implicitly indicate the devices or components must have specific direction, and be constructed and operated in a specific direction, shall not be construed to limit the present disclosure.

Besides, it is to be understood that the term "first" is used herein for purposes of description and are not intended to indicate or imply relative importance or to imply the number of indicated technical features. Thus, the features defined with "first" may explicitly or implicitly include one or more of these features. Furthermore, in the description of the present disclosure, "a plurality of" means two or more than two, unless be specified otherwise.

In the description of the present disclosure, it is to be understood unless specified or limited otherwise, terms such as "connected" should be understood broadly, and may be, for example, fixed connections, detachable connections, or integral connections; or may be mechanical connections, electrical connections, or mutual communication; or may be direct connections, indirect connections via intervening structures, connections of inner of two elements, or an interaction relationship between two element, which can be understood by those skilled in the art according to specific situations.

The water supply apparatus 100 according to the embodiment of the present disclosure will be described with reference to FIG. 1 and FIG. 2, wherein the water supply apparatus 100 may be a water dispenser. The following description of the present disclosure illustrates the water dispenser as an example of the water supply apparatus 100. It can be understood by those skilled in the art that the water supply apparatus 100 can also be a water purifier or a purifying drinking machine.

Figure 2:
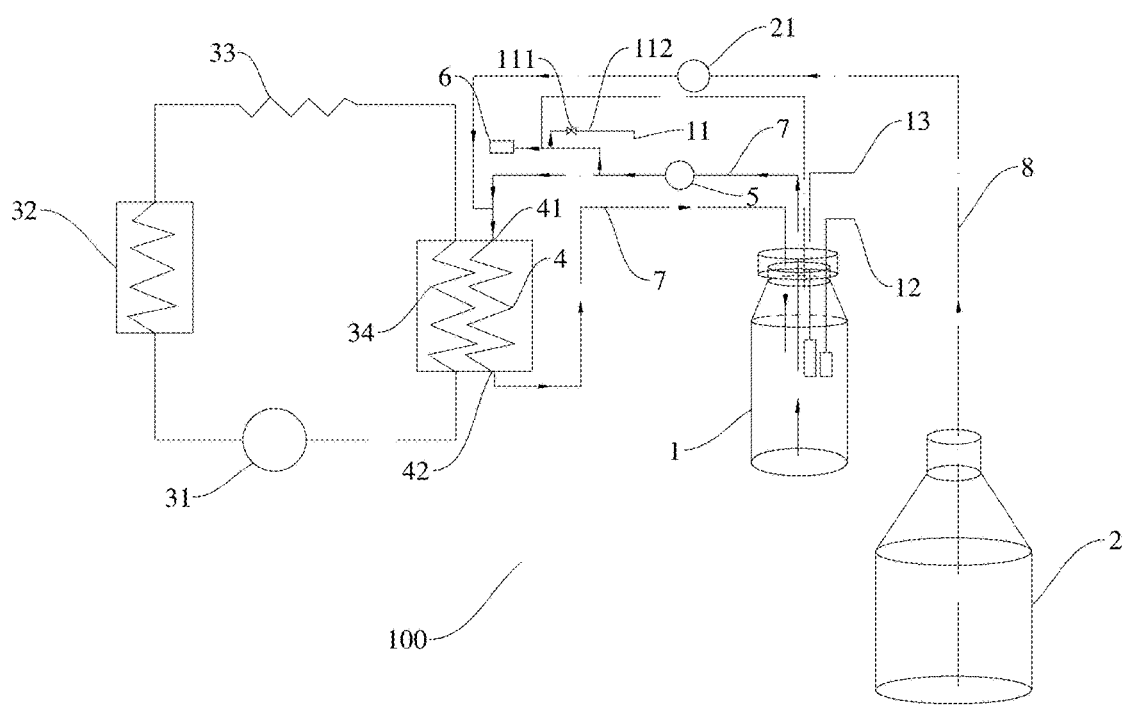
FIG. 2 is a schematic view of the water supply apparatus according to another embodiment of the present disclosure.

As shown in FIG. 1 and FIG. 2, the water supply apparatus 100 according to the present disclosure such as the water dispenser including a cooling tank 1, a refrigeration system and a heat exchange device 4.

Cooling tank 1 with a cold water outlet 11 can be used for storage of the cold water. When users need to drink cold water, the cold water in the cooling tank 1 can flows out through the cold water outlet 11 for the users' drinking. Wherein the cooling tank 1 is suitable for being connected with a water source, the water source is configured for supplying water to the cooling tank 1, for example, the water source can be a barreled water 2 stored in a barrel. Furthermore, a first water pump 21 can be arranged on the pipe line 8 which communicates the barreled water 2 with the cooling tank 1, and the first pump 21 is configured for delivering the barreled water in the barrel to the cooling tank 1.

The refrigeration system comprises a compressor 31, a condenser 32, a throttling device 33 and an evaporator 34 sequentially connected head to tail. Specifically, for example, as shown in the FIG. 1 and the FIG. 2, the compressor 31 has a suction port and an exhaust port, an end of the condenser 32 (e.g., the bottom end in the FIG. 1 and FIG. 2) is connected to the exhaust port of the compressor 31; an end of the evaporator 34 (e.g., the bottom end in the FIG. 1 and FIG. 2) is connected to the suction port of the compressor 31; the throttling device 33 is connected between the other end of the condenser 32 (e.g., the upper end in the FIG. 1 and FIG. 2) and the other end of the evaporator 34 ((e.g., the upper end in the FIG. 1 and FIG. 2), wherein the throttling device 33 can be a capillary or electronic expansion valve, etc.

When the refrigeration system is operated, the suction port of the compressor 31 sucks the lower pressured cooling medium which is generated from the evaporator 34, the cooling medium is compressed to a higher pressured cooling medium in compressor 31, and then the higher pressured cooling medium is discharged into condenser 32 from the exhaust port of the compressor 31, and the cooling medium is condensed into the higher pressured liquid in the condenser 32, and becomes the lower pressured liquid cooling medium through the throttling device 33 such as a capillary, then the cooling medium is delivered to the evaporator 34, in the evaporator 34, the cooling medium absorbs the heat and evaporates into the lower pressured gaseous cooling medium, then it is delivered to the suction port of the compressor 31, so as to complete the refrigeration circulation. Wherein it is needed to explain that the type of the cooling medium can be altered to adapt to the actual requirements and the present disclosure does not make specific limitation on this.

Heat exchange device 4 is provided outside the cooling tank 1. As shown in FIG. 1 and FIG. 2, the heat exchanger device 4 has a water inlet 41 and a water outlet 42, the water inlet 41 and the water outlet 42 are communicated to the inside of the cooling tank 1. The heat exchange device 4 is configured such that water in the cooling tank 1 flows into the heat exchange device 4 from the water inlet 41 and performs a heat exchange with the evaporator 34, the water after the heat exchange flows out from the water outlet 42 and flows back to the cooling tank 1.

As shown in FIG. 1 and FIG. 2, the cooling tank 1 and the evaporator 34 are set apart each other, the water in the cooling tank 1 cools down at the outside of the cooling tank 1 (that is, in heat exchange device 4), the cooled water back-flows to the cooling tank 1 for the users' drinking. Thus, by disposing the evaporator 34 outside the cooling tank 1, it can facilitate the cleaning of cooling tank 1 and improve the cooling effect.

With the water supply apparatus 100 such as a water dispenser according to the present disclosure, by disposing the heat exchange device 4 outside the cooling tank 1, the water in the cooling tank 1 may perform an heat exchange with the evaporator 34 at the outside of the cooling tank and 1, which facilitated the cleaning of cooling tank 1 and improved the cooling effect of the water supply apparatus 100 such as the water dispenser.

According to an optional embodiment of the present disclosure, the heat exchange device 4 comprises a body in which the water inlet 41 and the water outlet 42 are formed, wherein the evaporator 34 is provided inside the body. In this way, the water in the cooling tank 1 flows into the body through the water inlet 41, the water entered the body directly perform a heat exchange with the evaporator 34, and the heat exchange effect is excellent. The water after the heat exchange flows out from the water outlet 42 and flows back to the cooling tank 1, this circulation is continued until the temperature of water in the cooling tank 1 reaches a predetermined temperature. It can be understood that the specific value of the "predetermined temperature" can be adjusted according to actual needs of the users, for example, the predetermined temperature can be 2~10° C., the present disclosure does not make specific limitation on this.

According to another optional embodiment of the present disclosure, the heat exchange device 4 comprises a heat exchange tube, the water inlet 41 and the water outlet 42 are formed at a first end and a second end of the heat exchange tube respectively, and the evaporator 34 is provided outside the heat exchange tube. When the water supply apparatus 100 is operated, the water in the cooling tank 1 flows into the heat exchange tube through the water inlet 41 in the one end of the heat exchange tube, the evaporator 34 performs a heat exchange with the water in the heat exchange tube, thereby reducing the temperature of the water in the heat exchange tube. The cooled water can flow back to the cooling tank 1 through the water outlet 42 in another end of the heat exchange tube. Furthermore, a heat conduction part (not shown in the figures) can be provided between the evaporator 34 and the heat exchange tube so as to improve the heat exchange effect further.

As shown in FIG. 1 and FIG. 2, the water pump 5 can be provided between the cooling tank 1 and the water inlet 41, the water pump 5 can pump the water in the cooling tank 1 to the heat exchange device 4. Furthermore, the cold water outlet 11 can be connected in parallel to the downstream of the water pump 5. Hence, when the water pump 5 is operated, the water in the cooling tank 1 flows into the cold water outlet 11 and the heat exchange device 4 after the water flows through the water pump 5. Here, it is needed to note that the "downstream" can be understood as the downstream of the water which flowing through the water pump 5 in a flow direction.

As shown in FIG. 1 and FIG. 2, the cold water switch 111 can also be provided between the cold water outlet 11 and the water pump 5. When the cold water switch 111 is turned on, the water pump 5 is started. This moment, the water pump 5 will draw the cold water in the cooling tank 1, the majority of cold water flow to the cold water outlet 11 through the cold water switch 111, while a small portion of the cold water flows into the heat exchange device 4. After the cold water switch is turned off, no more water will flow out from the cold water outlet 11.

Wherein the cooling tank 1, the water pump 5 and the heat exchange device 4 can be connected through the connecting pipeline 7, the one end (for example, the bottom ends in FIG. 1 and FIG. 2) of the connecting pipeline 7 which is connected with the water pump 5 and extended to the cooling water tank 1 can extends into the bottom inside the cooling tank 1; the one end of the connecting pipeline 7 which is connected to the heat exchange device 4 and extended to into the cooling tank 1 can extends into the upper end inside of the cooling tank 1.

As shown in FIG. 1 and FIG. 2, the refrigeration temperature controller 12 can be provided inside the cooling tank 1, the refrigeration temperature controller 12 is configured for detecting the temperature of the water in the cooling tank 1. Optionally, the refrigeration temperature controller 12 can be positioned to the upper part inside of the cooling tank 1 so as to accurately detect the temperature of the water in the cooling tank 1.

Furthermore, the water level control switch 13 can be provided inside the cooling tank 1, the water level control switch 13 is configured for detecting the water level of the water in the cooling tank 1. Optionally, the water level control switch 13 can be positioned to the upper part inside of the cooling tank 1.

The water supply apparatus 100 could include a controller (not shown in the figures). The refrigeration temperature controller 12, the water level control switch 13, the first water pump 21, the water pump 5 and the compressor 31 are all connected to the controller. When the water level control switch 13 detected that the water in the cooling tank 1 reaches a predetermined water level, the controller can stop the first water pump 21 operating so as to stop the water sources such as the barreled water 2 supplying more water to the cooling tank 1. When the refrigeration temperature controller 12 detected that the temperature of the water in the cooling tank 1 reaches the predetermined temperature, the controller can stop the compressor 31 and the water pump 5 operating, and the water in the cooling tank 1 enters to the heat preservation state. It is understandable that the operating principle of the refrigeration temperature controller 12, the water level control switch 13 and the controller is already understood by those skilled in the art, and shall not give unnecessary details herein.

According to the further embodiment of the present disclosure, as shown in FIG. 1 and FIG. 2, the water supply apparatus 100 further comprises an exhausting device 6, and the exhaust device 6 is connected to the heat exchange device 4. Thus, by setting the exhaust device 6, the exhaust device 6 can discharge the gas in the connecting pipeline 7 when the water supply apparatus 100 is initially operated.

Furthermore, as show in FIG. 2, the exhausting device 6 can also communicate with the inner of the cooling tank 1 so as to exhaust the gas in the cooling tank 1 and the cooling tank can be closed cooling tank in this case. The gas such as air in the closed cooling tank can be exhausted through exhausting device 6 while the barreled water 2 is continuously supplied to the closed cooling tank, thereby the water which flows out from the water outlet 42 of the heat exchange device 4 can smoothly enter the cooling tank 1. Sure enough, the cooling tank 1 can be an open cooling tank. As shown in FIG. 1, the exhaust device 6 is not needed to directly connect to the cooling tank 1 in this case.

A plurality of embodiments of water supply apparatus 100 according to the present disclosure will be described below with reference to FIG. 1 and FIG. 2.

Embodiment 1:

As shown in FIG. 1, in the present embodiment, the barreled water 2 is connected to the water inlet 41 of the heat exchange device 4 through the first water pump 21. The cooling tank 1, the water pump 5 and the heat exchange device 4 can be connected in sequence through a plurality of connecting pipe 7 to constitute a circulation circuit. The cold water outlet 11 is connected to the downstream of the water pump 5, and a cold water switch 111 is provided on cold water pipe 112 which is connected to the cold water outlet 11. Furthermore, an exhausting device 6 which is suitable for discharging the gas in the circulation circuit is provided on the cold water pipe 112, wherein the cooling tank 1 is an open cooling tank.

When the water supply apparatus 100 such as a water dispenser is operated, the first pump 21 is turned on, and extracts the barreled water 2 from the barrel. The water flows into the heat exchange device 4 through the first water pump 21; the water entered the heat exchange device 4 performs a heat exchange (namely cooling) with the evaporator 34 and injected into the cooling tank 1, while the water pump 5 will extract out the water in the cooling tank 1. After flowing through the water pump 5, the water will flow through the cold water switch 111, and flows into the heat exchange device 4 in succession.

The first water pump 21 stops operating when the water in the cooling tank 1 reached a predetermined water level. At this moment, the water pump 5 keeps extracting water from the cooling tank 1, the water after flowing through the water pump 5 flows into the heat exchange device 4, and performs a heat exchange with the evaporator 34, and the evaporator 34 cools the water in the heat exchange device 4. The circulation will be continued until the temperature of the water in the cooling tank 1 reaches the predetermined temperature. At this moment, the refrigeration temperature controller 12 is disconnected while the compressor 31 and the water pump 5 stops operating. At the same time, the water inside the cooling tank 1 enters the heat preservation state. When the temperature of the water in the cooling tank 1 increases, the water pump 5 continues to operate and continues to cool the water, this circulation will be continued until the water temperature dropped to the predetermined temperature.

When the user wants to drink cold water, user can turn the cold water switch 111 on, and then the water pump 5 is started, the cold water is extracted from the bottom of the cooling tank 1 at this moment. The majority of the cold water flows to the cold water outlet 11 through the cold water switch 111, while a small portion of the cold water and the water flowing through the first water pump 21 will flow to the heat exchange device 4 together.

Thus, the water in the cooling tank 1 is cooled outside the cooling tank 1 by disposing the evaporator 34 and the heat exchange device 4 outside the cooling tank 1, and the cooling effect is excellent. In addition, if there is a need for cleaning the cooling tank 1, the cooling tank 1 can be easily removed, and the cleaning of the cooling tank 1 is more convenient.

Embodiment 2:

As shown in FIG. 2, the structure of the present embodiment is generally same to the structure of embodiment 1, wherein the same part uses the same reference numeral. The difference lies in that the cooling tank 1 is a closed cooling tank, and the exhausting device 6 is connected to the inner of the cooling tank 1, so as to exhaust the gas in the cooling tank 1.

The water supply apparatus 100 in the present embodiment is basically same to the water supply apparatus 100 in the embodiment 1. The difference lies in that when the water is initially supplied, the gases such as air in cooling tank 1 need to be exhausted through the exhausting device 6. It should be noted that the operating principle of other parts of the water supply apparatus 100 in present embodiment is basically same to the operating principle of that of the water supply apparatus 100 in the embodiment 1, so it shall not give unnecessary details herein.

The other constitution and operation principle of the water supply apparatus 100 such as a water dispenser according the present disclosure is understood by those skilled in the art, and shall not explained in detail herein.

In the description of this specification, the reference terms "one embodiment", "some embodiments", "schematic embodiment", "example", "specific example" or "some examples" are represent at least one of the specific features, structures, materials, or characteristics included in the present embodiments or examples of the present disclosure. In this manual, the schematic representation of the above terms does not necessarily indicate the same embodiment or example. Moreover, the specific characteristics, the structures, the materials, or the characteristics in the description can be combined with any one or a plurality of embodiment or examples in a suitable way.

Although the embodiments of the present disclosure have been shown and described, those skilled in the art should understand that various changes, modification, replacement and transformations made by those skilled in the art based on the principle and purpose of the embodiments in the present disclosure. The scope of the present disclosure is defined by the claims and the like.

What is claimed is:

1. A water supply apparatus, comprising:
   a cooling tank with a cold water outlet, wherein the cooling tank is suitable for being connected with a water source and the water source is configured for supplying water to the cooling tank;
   a refrigeration system comprising a compressor, a condenser, a throttling device and an evaporator sequentially connected head to tail; and
   a heat exchange device disposed outside the cooling tank and provided with a water inlet and a water outlet communicating with an inside of the cooling tank;
   wherein the cooling tank is a component separated from the heat exchange device and is connected to the heat exchange device through a connecting pipeline, and the heat exchange device is configured such that water in the cooling tank flows into the heat exchange device from the water inlet and performs a heat exchange with the evaporator, the water after the heat exchange flows out from the water outlet and flows back to the cooling tank.

2. The water supply apparatus according to claim 1, wherein the heat exchange device comprises a body in which the water inlet and the water outlet are formed, wherein the evaporator is provided inside the body.

3. The water supply apparatus according to claim 1, wherein the heat exchange device comprises a heat exchange tube, the water inlet and the water outlet are formed at a first end and a second end of the heat exchange tube respectively, and the evaporator is provided outside the heat exchange tube.

4. The water supply apparatus according to claim 1, wherein a water pump is provided between the cooling tank and the water inlet.

5. The water supply apparatus according to claim 4, wherein a cold water switch is provided between the cold water outlet and the water pump.

6. The water supply apparatus according to claim 1, wherein a refrigeration temperature controller is provided in the cooling tank.

7. The water supply apparatus according to claim 1, wherein a water level control switch is provided in the cooling tank.

8. The water supply apparatus according to claim 1, further comprising an exhausting device connected with the heat exchange device.

9. The water supply apparatus according to claim 8, wherein the exhausting device is communicated to an inside of the cooling tank so as to exhaust the gas in the cooling tank.

10. The water supply apparatus according to claim 1, wherein the cooling tank is an open cooling tank or a closed cooling tank.

11. The water supply apparatus according to claim 1, wherein the throttling device is a capillary or an electronic expansion valve.

12. The water supply apparatus according to claim 1, wherein the water supply apparatus is a water dispenser, a water purifier or a purifying drinking machine.

13. A water supply apparatus, comprising:
- a cooling tank with a cold water outlet, wherein the cooling tank is suitable for being connected with a water source and the water source is configured for supplying water to the cooling tank;
- a refrigeration system comprising a compressor, a condenser, a throttling device and an evaporator sequentially connected head to tail; and
- a heat exchange device disposed outside the cooling tank and provided with a water inlet and a water outlet communicating with an inside of the cooling tank;
- an exhausting device connected with the heat exchange device;
- wherein the heat exchange device is configured such that water in the cooling tank flows into the heat exchange device from the water inlet and performs a heat exchange with the evaporator, the water after the heat exchange flows out from the water outlet and flows back to the cooling tank;
- wherein the exhausting device is communicated to an inside of the cooling tank so as to exhaust the gas in the cooling tank.

* * * * *